US012739842B2

(12) United States Patent
Yoshimura et al.

(10) Patent No.: US 12,739,842 B2
(45) Date of Patent: Sep. 15, 2026

(54) COMMUNICATIONS NETWORK AND METHODS WITH ENHANCED DUPLEX

(71) Applicant: SHARP Kabushiki Kaisha, Sakai City (JP)

(72) Inventors: Tomoki Yoshimura, Camas, WA (US); Zhanping Yin, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 585 days.

(21) Appl. No.: 17/981,667

(22) Filed: Nov. 7, 2022

(65) Prior Publication Data

US 2024/0155619 A1 May 9, 2024

(51) Int. Cl.
*H04W 72/23* (2023.01)
*H04L 5/14* (2006.01)

(52) U.S. Cl.
CPC ............... *H04W 72/23* (2023.01); *H04L 5/14* (2013.01)

(58) Field of Classification Search
CPC .......... H04L 5/14; H04L 5/003; H04W 72/23; H04W 72/042
See application file for complete search history.

(56) References Cited

U.S. PATENT DOCUMENTS

2023/0254075 A1* 8/2023 Cozzo ............... H04W 72/0446
2023/0328656 A1* 10/2023 Rudolf ................ H04W 52/143
2023/0397262 A1* 12/2023 Zhang ................... H04L 5/0064
2024/0048349 A1* 2/2024 Abdelghaffar ............ H04L 5/14
2024/0089960 A1* 3/2024 Hao .................. H04W 72/0446
2024/0098708 A1* 3/2024 Zhang ................... H04W 72/11
2024/0146490 A1* 5/2024 Zhang ................... H04L 5/0005
2025/0071755 A1* 2/2025 Seok ......................... H04L 5/14

OTHER PUBLICATIONS

CMCC: "Discussion on subband non-overlapping full duplex", 3GPP Draft; R1-2204304, vol. RAN WG1, No. e-Meeting; May 9, 2022-May 20, 2022, Apr. 29, 2022 (Apr. 29, 2022), XP052153467, Retrieved from the Internet: URL:https://ftp.3gpp.org/tsg_ran/WG1_RL1/TSGR1_109-e/Docs/R1-2204304. zip R1-2204304—Discussion on subband non-overlapping full duplex.docx [retrieved on Apr. 29, 2022], 10 pp.

RP-221435, "Revised WID on Multi-carrier enhancements", NTT Docomo, Inc., 3GPP TSG RAN Meeting #96, Budapest, Hungary, Jun. 6-9, 2022.

* cited by examiner

*Primary Examiner* — Andrew Lee
(74) *Attorney, Agent, or Firm* — ScienBiziP, P.C.

(57) ABSTRACT

A wireless terminal communicates across a radio interface with a radio access network. The wireless terminal comprises receiver circuitry and processor circuitry. The receiver circuitry is configured to receive a downlink signal from the radio access network. The processor circuitry is configured to determine a resource assignment (mapping) of the downlink signal to a resource grid of time/frequency radio resources in a SubBand Full Duplex, SBFD, region of the grid in a case that a SBFD uplink, UL, resource set overlaps with a synchronization signal/physical broadcast, SS/PBCH, block in a time domain of the SBFD region.

2 Claims, 10 Drawing Sheets

RECEIVING A DOWNLINK SIGNAL ACROSS THE RADIO INTERFACE 6-1

DETERMINING A RESOURCE ASSIGNMENT (MAPPING) OF THE DOWNLINK SIGNAL TO A RESOURCE GRID OF TIME/FREQUENCY RADIO RESOURCES IN A SUBBAND FULL DUPLEX, SBFD, REGION OF THE GRID IN A CASE THAT A SBFD UPLINK, UL, RESOURCE SET OVERLAPS WITH A SYNCHRONIZATION SIGNAL/PHYSICAL BROADCAST, SS/PBCH, BLOCK IN A TIME DOMAIN OF THE SBFD REGION 6-2

RECEIVING A DOWNLINK SIGNAL ACROSS THE RADIO INTERFACE 6-1

DETERMINING A RESOURCE ASSIGNMENT (MAPPING) OF THE DOWNLINK SIGNAL TO A RESOURCE GRID OF TIME/FREQUENCY RADIO RESOURCES IN A SUBBAND FULL DUPLEX, SBFD, REGION OF THE GRID IN A CASE THAT A SBFD UPLINK, UL, RESOURCE SET OVERLAPS WITH A SYNCHRONIZATION SIGNAL/PHYSICAL BROADCAST, SS/PBCH, BLOCK IN A TIME DOMAIN OF THE SBFD REGION 6-2

*Fig. 6*

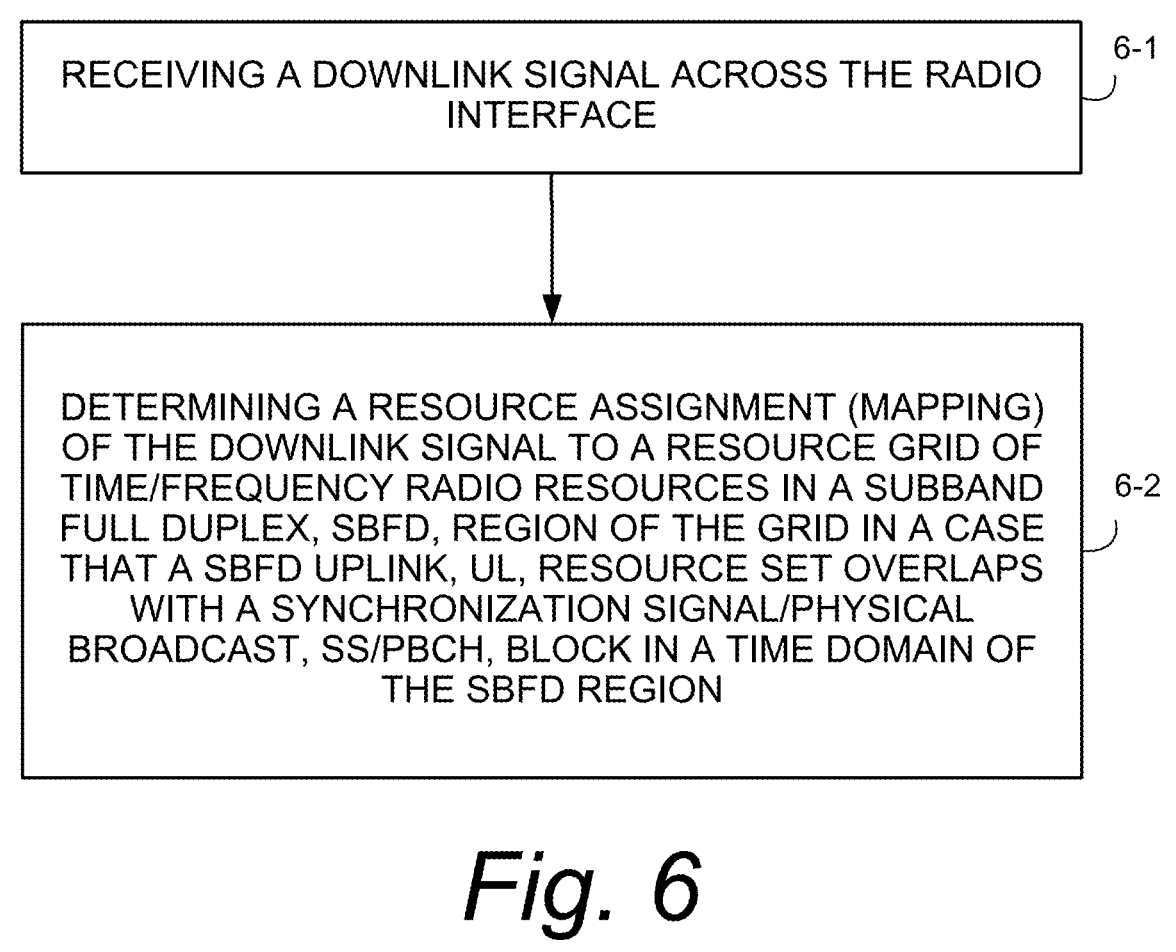

COMMUNICATIONS NETWORK AND METHODS WITH ENHANCED DUPLEX

TECHNICAL FIELD

The technology relates to wireless communications, and particularly to wireless terminals and operations thereof including duplexed operations thereof.

BACKGROUND

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth-generation system, e.g., the 5G System, also called "NR" or "New Radio", as well as "NG" or "Next Generation", is shown in FIG. 1, and is also described in 3GPP TS 38.300. The 5G NR network is comprised of NG RAN, Next Generation Radio Access Network, and 5GC, 5G Core Network. As shown, NGRAN is comprised of gNBs, e.g., 5G Base stations, and ng-eNBs, i.e., LTE base stations. An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations, i.e., gNB & ng-eNB. A gNB node provides NR user plane and control plane protocol terminations towards the UE and is connected via the NG interface to the 5GC. The 5G NR, New Radio, gNB is connected to Access and Mobility Management Function, AMF, and User Plane Function, UPF, in the 5G Core Network, 5GC.

Wireless transmissions from a base station in a direction toward a wireless terminal is referred to as being on the "downlink", DL, transmissions from the wireless terminal in a direction toward the base station is referred to as being on the "uplink", UL. As described in more detail herein, the transmissions may occur in a frame or sub-frame structure which may be conceptualized as a two-dimensional grid. The grid may be structured to have time slots in a first dimension and frequencies or sub-carriers in a second dimension. Time division duplex, TDD, operation occurs when information of the frame or sub-frame is split on a time basis between uplink and downlink. In TDD operation there may be a mapping or assignment, referred to as a TDD pattern, of time slots to uplink and downlink transmissions. Frequency division duplex, FDD, operation occurs when information of the frame or sub-frame is split on a frequency or sub-carrier basis between uplink and downlink.

Uplink coverage is a significant factor for a radio access network. In time division duplex, TDD, operation, uplink coverage is limited by the TDD pattern since the TDD pattern determines the maximum allowable transmission power for the wireless terminal. For example, when the TDD pattern is DL heavy, e.g., when a significant number of time slots are utilized for downlink transmission, the UE has less maximum allowable transmission power. As a result, uplink coverage is limited. Conversely, if the network is deployed with a UL heavy TDD pattern, e.g., when a significant number of time slots are utilized for uplink transmission, the network cannot serve enough DL traffic. Therefore, 3GPP takes into consideration operation with simultaneous transmission/reception for base station nodes within frequency resource(s).

Uplink coverage is a significant factor for cellular network. In time division duplex, TDD, operation, uplink coverage is limited by a ratio $R_{UL/DL}$ of uplink resource and downlink resource. The more the amount of resource usable for uplink, the larger the uplink power, and thus the bigger the uplink coverage. Dynamic TDD operation, e.g., operation in which there may be a frequent change of the ratio $R_{UL/DL}$, depending on traffic demand, is a candidate for uplink coverage enhancement. For example, the system may increase the amount of uplink resource.

What is needed are methods, apparatus, and/or techniques to deal with allocation and/or mapping of radio resources for uplink channels in a duplex operation.

SUMMARY

A wireless terminal communicates across a radio interface with a radio access network. The wireless terminal comprises receiver circuitry and processor circuitry. The receiver circuitry is configured to receive a downlink signal from the radio access network. The processor circuitry is configured to determine a resource assignment (mapping) of the downlink signal to a resource grid of time/frequency radio resources in a SubBand Full Duplex, SBFD, region of the grid in a case that a SBFD uplink, UL, resource set overlaps with a synchronization signal/physical broadcast, SS/PBCH, block in a time domain of the SBFD region. Methods of operating wireless terminals according to example example embodiments and modes are also disclosed.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 6 is a flowchart showing example, representative acts or steps performed by the wireless terminal of FIG. 5.

DETAILED DESCRIPTION

Figure 1:
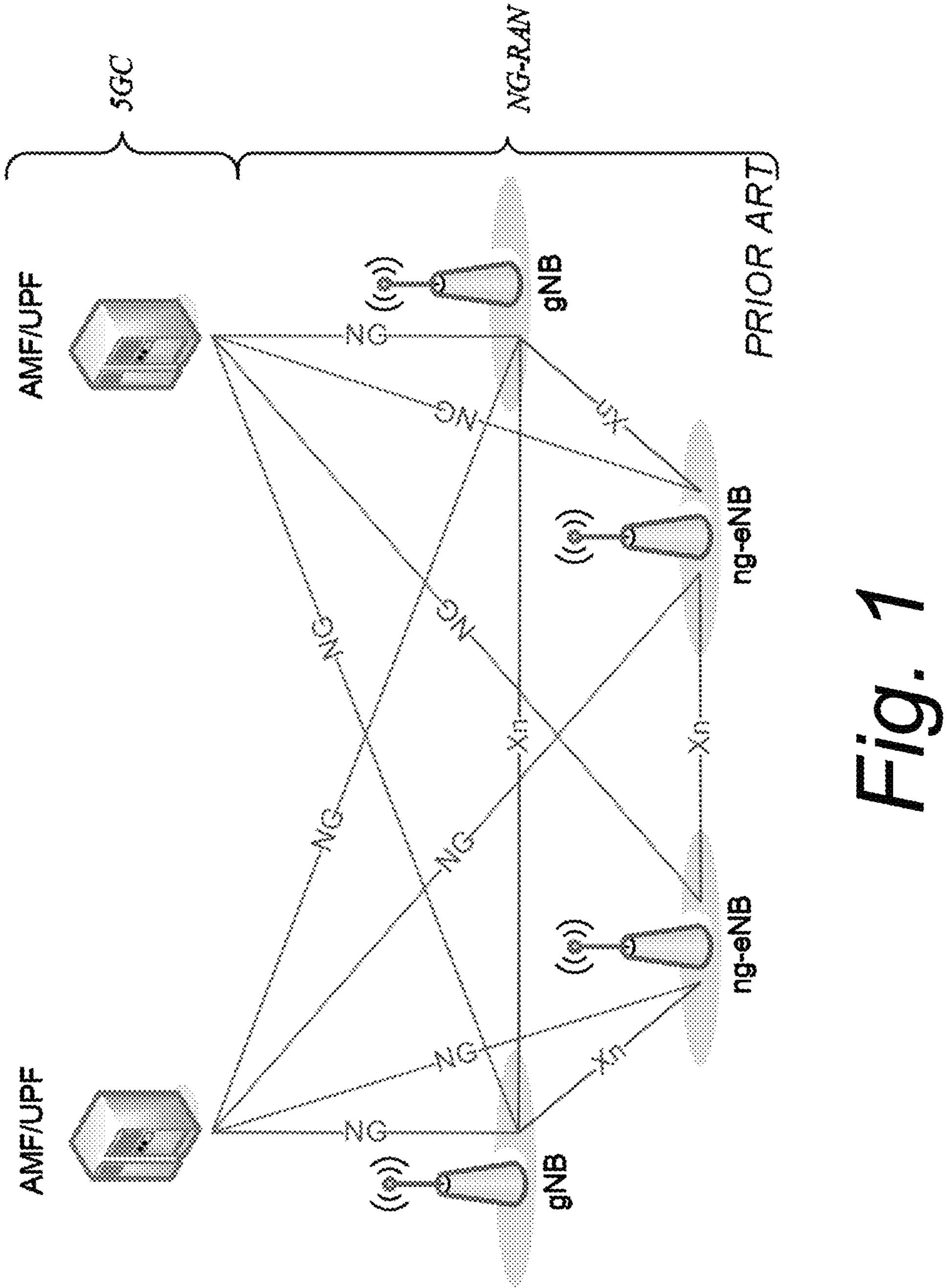
FIG. 1 is a diagrammatic view of overall architecture for a 5G New Radio system.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel. All or a subset of the cell may be adopted by 3GPP as licensed bands, e.g., frequency band, to be used for communication between a base station, such as a Node B, and a UE terminal. A cellular network using frequency bands can include configured cells. Configured cells can include cells of which a UE terminal is aware and in which it is allowed by a base station to transmit or receive information. Examples of cellular radio access networks include E-UTRAN or New Radio, NR, and any successors thereof, e.g., NUTRAN.

A core network, CN, may comprise numerous servers, routers, and other equipment. As used herein, the term "core network" can refer to a device, group of devices, or subsystem in a telecommunication network that provides services to users of the telecommunications network. Examples of services provided by a core network include aggregation, authentication, call switching, service invocation, gateways to other networks, etc. For example, a core network (CN) may comprise one or more management entities, which may be an Access and Mobility Management Function, AMF.

As used herein, for a UE in IDLE Mode, a "serving cell" is a cell on which the wireless terminal in idle mode is camped. See, e.g., 3GPP TS 38.304. For a UE in RRC CONNECTED not configured with carrier aggregation, CA/dual connectivity, DC, there is only one serving cell comprising the primary cell. For a UE in RRC CONNECTED configured with CA/DC the term 'serving cells' is used to denote the set of cells comprising of the Special Cell(s) and all secondary cells. See, e.g., 3GPP TS 38.331.

Figure 2:
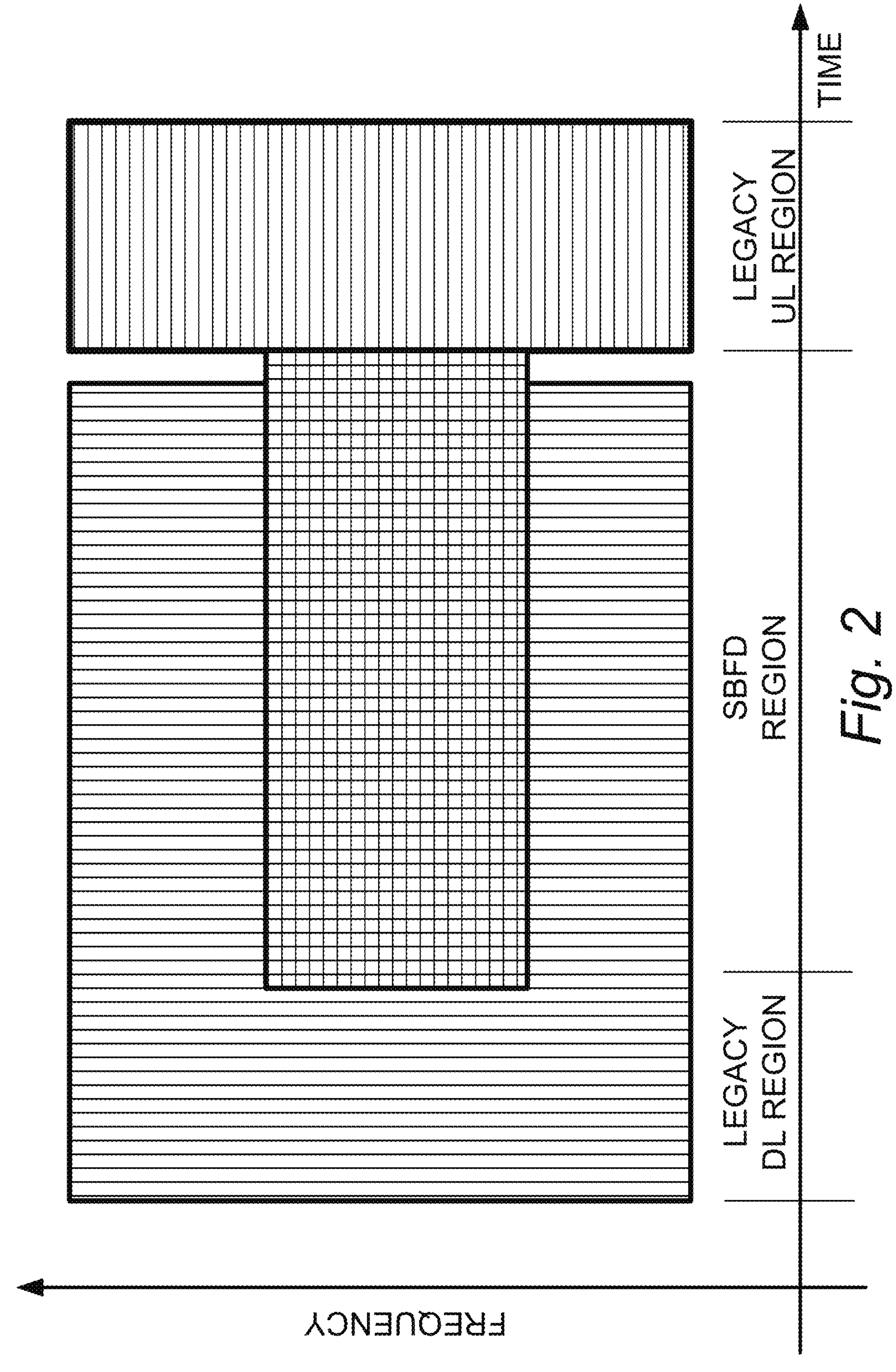
FIG. 2 is a diagrammatic view an example a resource grid capable of SubBand Full Duplex, SBFD, operation and showing a SBFD UL resource set.

FIG. 2 shows an example resource grid which illustrates, e.g., enhanced duplex communication. The resource grid of FIG. 2 is a two-dimensional grid extending in a time domain (shown by a horizontal axis in FIG. 2) and a frequency domain (shown by a vertical axis in FIG. 2). The time domain of the illustrated resource grid is further divided into regions, including (from left to right):

- a legacy downlink, DL, region, which is a region for resources for downlink transmissions, e.g., from the radio access network to a wireless terminal, in accordance with legacy operation, and thus is labeled as the "Legacy DL region".
- a subband frequency duplex, SBFD, region. The SBFD region overlaps with the UL resource set in the time domain. In the SBFD (SubBand Full Duplex) region the base station may perform DL transmission outside the UL resource set and perform UL reception inside the UL resource set simultaneously.
- a legacy uplink, UL, region, which is a region for uplink transmission, e.g., from the wireless terminal to the radio access network, in accordance with legacy operation, and thus is labeled as the "Legacy UL region".

Thus, the Legacy DL region represents the DL region other than the SBFD region where the base station is not able to perform UL reception. Legacy UL region represents the UL region where the base station is not able to perform DL transmission.

FIG. 2 shows by horizontal hatching the portions of the resource grid which are for downlink transmissions; FIG. 2 shows by vertical hatching the portions of the resource grid which are for uplink transmissions; FIG. 2 shows by both, i.e., superimposed, vertical and horizontal hatching certain resources in the SBFD region that are available for UL transmission. The area of region of the grid of FIG. 2 that is illustrated with both vertical and horizontal hatching is also referred to as a SBFD UL resource set or, more simply, the "UL resource set". "SBFD UL resource set" and "UL resource set "may be used interchangeably herein.

It should be understood that the time/frequency locations of the regions of the resource grid may be configured in a semi-static manner, and that the DL region and the UL region may be configured by RRC signaling. For example, the DL region spans 3 slots and 12 OFDM symbols, and UL region spans 1 slot. The remaining 2 OFDM symbols between the DL region and the UL region are regarded as gap for DL-UL switching.

As mentioned above, both vertical and horizontal hatching indicates a SBFD UL resource set. The UL resource set is a set of time/frequency resources which may be used for uplink transmission.

The wireless terminal which communicates with the base station recognize the UL resource set. For example, the wireless terminal may determine resource assignment for DL signals such as PDSCH, PDCCH, or CSI-RS. For example, the wireless terminal may determine resource assignment for the DL signals such that the DL signals do not overlap with the UL resource set.

Figure 3:
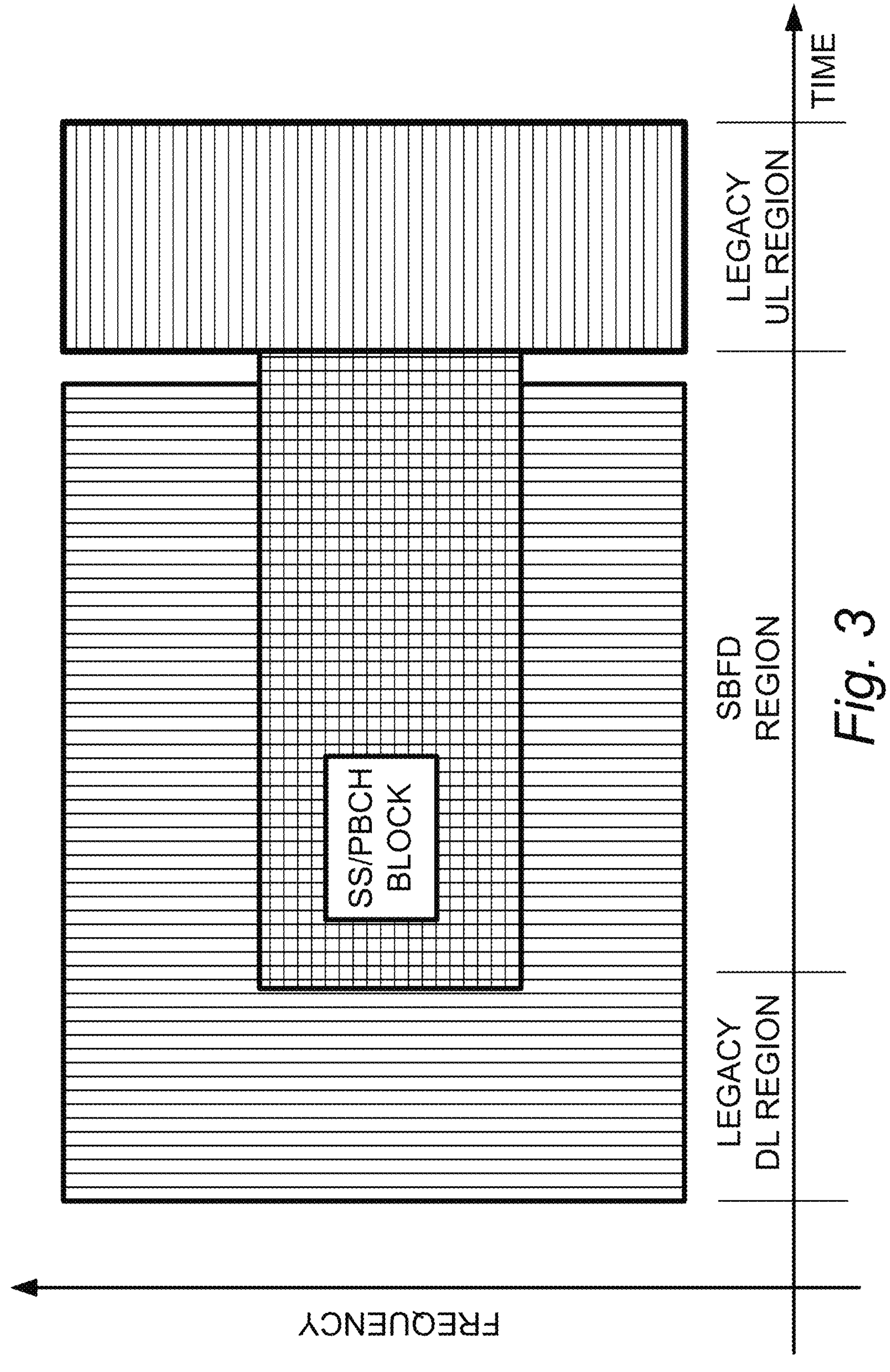
FIG. 3 is a diagrammatic view an example a resource grid capable of SubBand Full Duplex, SBFD, operation with an example SS/PBCH block on a UL resource set.

An issue may occur if synchronization signal/physical broadcast, SS/PBCH, blocks are placed in the SBFD region. FIG. 3 shows an example of SS/PBCH block on the UL resource set. Since the UL resource set should also be able be used for DL transmission, the SS/PBCH block can be placed within the UL resource set. The situation shown in FIG. 3 implies that the SS/PBCH block disables the UL usage of the UL resource set in OFDM symbols with the SS/PBCH block.

Figure 4:
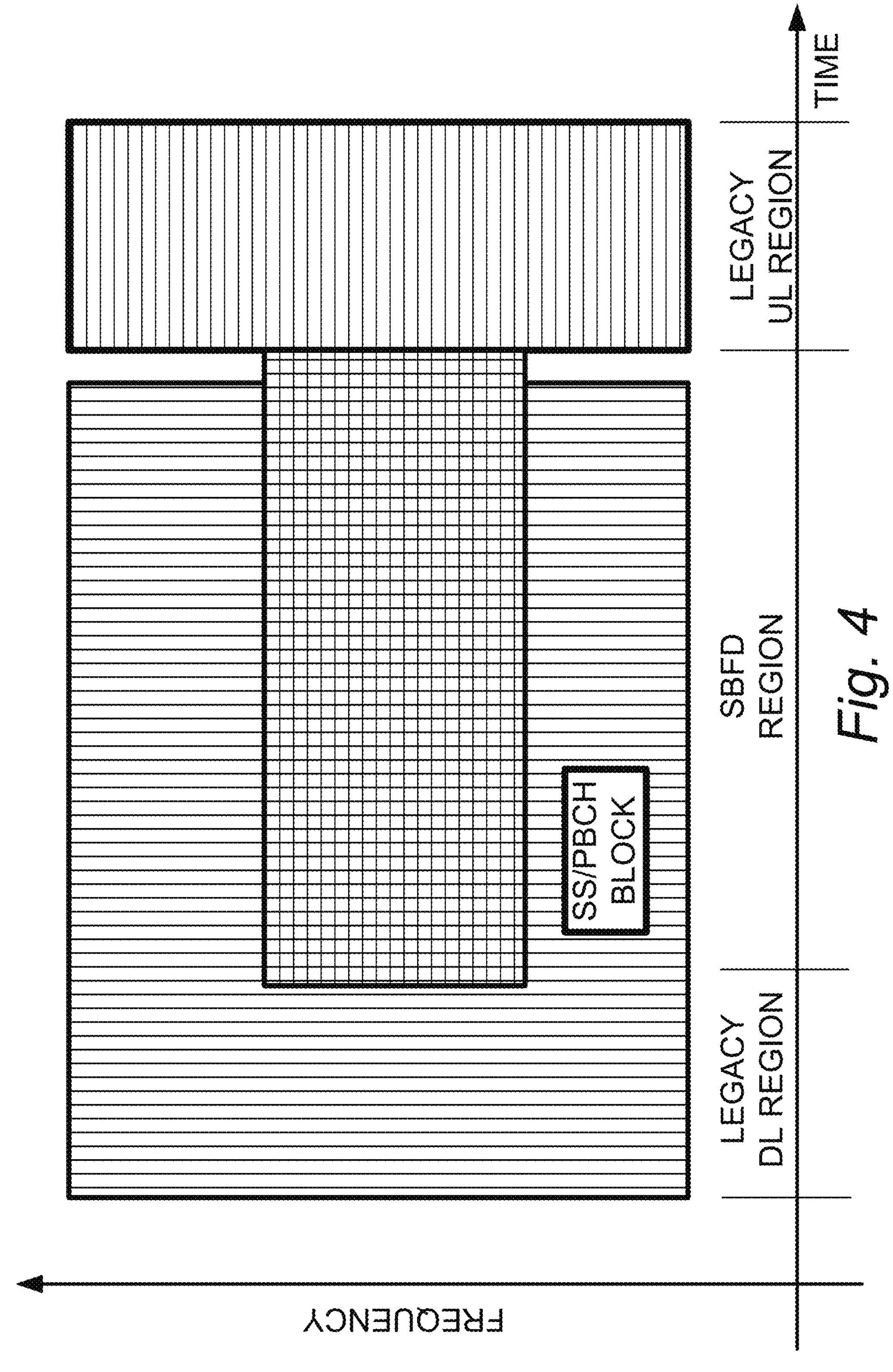
FIG. 4 is a diagrammatic view an example a resource grid capable of SubBand Full Duplex, SBFD, operation with an example SS/PBCH block which overlaps with the UL resource set in a time domain, but not in a frequency domain.

Another example is shown in FIG. 4. In FIG. 4, the SS/PBCH block overlaps with the UL resource set in time domain, but not in frequency domain.

In example situations such as those described herein, for example, the wireless terminals of the example embodiments and modes of the technology disclosed herein have the ability and function to recognize an association between the UL resource set and the SS/PBCH block. Thereby, the wireless terminals of the example embodiments and modes appropriately determine resource assignment for DL signals.

Figure 5:
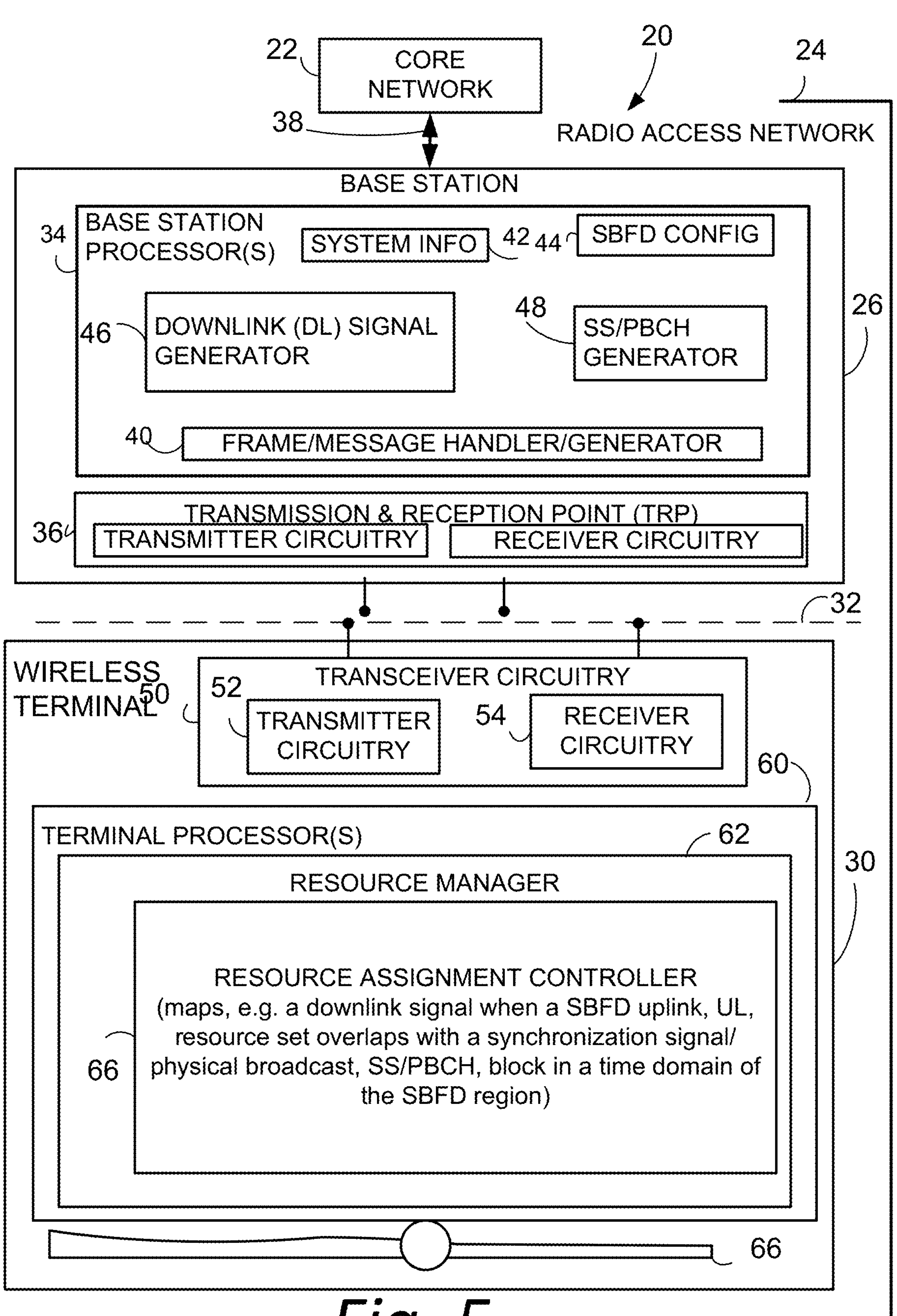
FIG. 5 is a schematic view of a communications system showing a core network, a radio access network, with the radio access network including a wireless terminal, and wherein the wireless terminal determines mapping of a downlink signal in a situation in which a SBFD uplink, UL, resource set overlaps with a synchronization signal/physical broadcast, SS/PBCH, block in a time domain of the SBFD region.

FIG. 5 shows, in generic manner, a communications network in which a wireless terminal determine a resource assignment, e.g., mapping, of a downlink signal to a resource grid of time/frequency radio resources in a Sub-Band Full Duplex, SBFD, region of the grid in a case that a SBFD uplink, UL, resource set overlaps with a synchronization signal/physical broadcast, SS/PBCH, block in a time domain of the SBFD region. The network 20 of FIG. 5, which may be a 5G network, for example, comprises core network 22 connected to at least one radio access network 24. The radio access network 24 in turn comprises one or more radio access network (RAN) nodes, such as example base station node 26 which is shown as being connected to the core network 22 by wireline(s) 28. The base station node 26 serves at least one cell.

The radio access network, RAN, 24 typically comprises plural access nodes, one example access nodes 26 being illustrated as a base station node in FIG. 5. As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), a relay node, a mobile relay node, or some other similar terminology.

FIG. 5 shows the radio access network 24, and base station node 26 through its cell in particular communicating with wireless terminal 30 across a radio or air interface 32. The base station node 26 may, and usually does, communicate with plural wireless terminals across the air interface 32. Only one wireless terminal 30 is shown for sake of simplicity, it being understood that other wireless terminals may be provided and may operate in similar manner as the wireless terminal 30 herein illustrated.

FIG. 5 shows base station node 26 as comprising base station processor circuitry which may comprise one or more base station processors 34, as well as base station transceiver circuitry 36. As illustrated in FIG. 5, the base station transceiver circuitry 36 may be a transmission and reception point (TRP). The transmission and reception point (TRP) 36 may further comprise transmitter circuitry and receiver circuitry.

The base station processors 34 may comprise frame/message handler/generator 40 which prepares and generates information including user data and messages, e.g., signaling, for transmission over the radio interface 32, as which also processes information received over the radio interface 32. The base station processors 34 may also comprise system information block, SIB, generator 42 which serves to generate or at least store system information which is broadcast over the radio interface 32. The base station processors 34 may also comprise SBFD configuration memory 44, which stores the configuration of the Sub-Band Full Duplex, SBFD, region. In some example embodiments and modes or scenarios, the SBFD configuration information may be included in the system information generated by system information block, SIB, generator 42. In other example embodiments and modes or scenarios, the SBFD configuration information may be included in radio resource control, RRC, signaling generated by a radio resource control unit which comprises base station processors 34 and which is included in a RRC message generated by frame/message handler/generator 40.

As used herein, SBFD configuration is comprised of information for configuring the wireless terminal. SBFD configuration may include information for configuring some or all of UL subband, DL subband, and SBFD region. For example, SBFD configuration may include information indicating SBFD region. For example, SBFD configuration may include information indicating TDD pattern. For example, SBFD configuration may include information indicating size and/or location of subbands.

The base station processors 34 may further comprise downlink signal generator 46 and synchronization signal/physical broadcast channel, SS/PBCH, block generator 48. The downlink signal generator 46 may generate any appropriate downlink signal or channel, such as Physical Downlink Shared Channel, PDSCH, for example.

Communication between radio access network (RAN) 22 and wireless terminal over the radio interface 32 may occur on various layers. Layer 1 includes radio layer 1 or the physical layer. Higher layers, e.g., layers higher than Layer 1 may include radio layer 2 and radio resource control layer 3. The layer 1 communication may occur by utilization of "resources". Reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource may occur in the context of a "frame" of information that is typically formatted and prepared, e.g., by a node. A frame, which may have both downlink portion(s) and uplink portion(s), is communicated between the base station and the wireless terminal. Each frame may comprise plural subframes. For example, in the time domain, a 10-millisecond frame consists of ten one millisecond subframes. A subframe is divided into one or more slots (so that there are thus a multiple of 10 slots in a frame). The transmitted signal in each slot is described by a resource grid comprised of resource elements (RE). Each column of the two-dimensional grid represents a symbol (e.g., an OFDM symbol) from node to wireless terminal. Each row of the grid represents a subcarrier. A resource element, RE, is the smallest time-frequency unit for transmission in the subframe. That is, one symbol on one sub-carrier in the sub-frame comprises a resource element (RE) which is uniquely defined by an index pair (k, l) in a slot (where k and/are the indices in the frequency and time domain, respectively). In other words, one symbol on one sub-carrier is a resource element (RE). Each symbol comprises a number of sub-carriers in the frequency domain, depending on the channel bandwidth and configuration. The –frequency resource supported by the standard today is a set of plural subcarriers in one OFDM symbols (e.g., plural resource elements (RE)) and is called a resource block (RB). A resource block may comprise, for example, 12 resource elements, i.e., 12 subcarriers and 7 symbols.

In 5G New Radio ("NR"), a frame consists of 10 millisecond, milli-second, duration. A frame consists of 10 subframes with each having 1 ms duration like LTE. Each subframe consists of $2^{\mu}$ slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. A mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

As used herein, "serving cell frequency resource" refers to a plurality of radio resources which may radio resources comprising layer 1 communications between base station node 26 and wireless terminal 30. As such, "serving cell frequency resource" encompasses and includes a frame, having examples described above, or a resource grid, or plural carriers, for example. The serving cell frequency resource typically includes a control region. In New Radio, the control region can be placed in any region in time/frequency domain, whereas in some earlier LTE versions the control region should be preferably located in the beginning of a subframe. The control region may include scheduling information. An example of scheduling information is a PDCCH with a downlink control information, DCI format. The scheduling information may describe or reference other portions of the serving cell frequency resource. The other portion of serving cell frequency resource that may be described or referenced by the scheduling information may be one or more physical channels. An example physical channel is the physical downlink shared channel, PDSCH.

The base station node 26 may be structured essentially as shown in FIG. 5 or may be a node having architecture such as split architecture comprising a central unit and one or more distributed units that comprise mobile termination (MT). The base station processor(s) may include one or more TRPs.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

FIG. 5 also shows various example constituent components and functionalities of wireless terminal 30. For example, FIG. 5 wireless terminal 30 as comprising terminal transceiver circuitry 50. The transceiver circuitry 50 in turn may comprise terminal transmitter circuitry 52 and terminal receiver circuitry 54. The terminal transceiver circuitry 50 may include antenna(e) for the wireless transmission. Terminal transmitter circuitry 52 may include, e.g., amplifier(s), modulation circuitry and other conventional transmission equipment. Terminal receiver circuitry 54 may comprise, e.g., amplifiers, demodulation circuitry, and other conventional receiver equipment.

The terminal receiver circuitry 54 is, in the generic example embodiment and mode of FIG. 5, configured to receive, over the radio interface, e.g., information concerning scheduling of a virtual resource block for a downlink channel such as the Physical Downlink Shared Channel, PDSCH. In some example embodiments and modes terminal receiver circuitry 54 may also receive information concerning an alternate resource allocation technique and a physical resource block corresponding to the virtual resource block of the downlink channel.

FIG. 5 further shows wireless terminal 30 also comprising wireless terminal processor circuitry, e.g., one or more wireless terminal processor(s) 60. The wireless terminal 30, e.g., wireless terminal processor(s) 60, may comprise resource manager 62. The resource manager 62 may also be referred to or function as a frame/message generator/handler. The wireless terminal processor(s) 60 may comprise resource assignment controller 66.

In a simple implementation of the example embodiment and mode of FIG. 5, the wireless terminal processor(s) 60 may simply receive information from base station node 26 that will enable wireless terminal 30 to know the location of the physical downlink channel of interest. For example, the wireless terminal 30 may receive, in a message or signal, an indication of the location of the physical downlink channel in the frame after the base station node 26 has performed a check and possibly overridden the mapping of the default mapping scheme.

As indicated above, however, an issue may occur if synchronization signal/physical broadcast, SS/PBCH, blocks are placed in the SBFD region. As explained herein, resource assignment controller 66 of the wireless terminal 30 of FIG. 5 determine a resource assignment, e.g., a mapping, of the downlink signal to a resource grid of time/frequency radio resources in a SubBand Full Duplex, SBFD, region of the grid in a case that a SBFD uplink, UL, resource set overlaps with a synchronization signal/physical broadcast, SS/PBCH, block in a time domain of the SBFD region. The downlink signal may be one of a physical downlink shared channel, PDSCH; a physical downlink control channel, PDCCH; and a channel state information-reference signal, CSI-RS.

FIG. 6 shows example acts or steps which may optionally be performed by the wireless terminal 30 in a generic mode of FIG. 5. Act 6-1 comprises the wireless terminal 30 receiving a downlink signal across the radio interface. Act 6-2 comprises the wireless terminal 30, and resource assignment controller 66 for example, determining a resource assignment (mapping) of the downlink signal to a resource grid of time/frequency radio resources in a SubBand Full Duplex, SBFD, region of the grid in a case that a SBFD uplink, UL, resource set overlaps with a synchronization signal/physical broadcast, SS/PBCH, block in a time domain of the SBFD region.

The wireless terminal 30 knows the location of the synchronization signal/physical broadcast, SS/PBCH, block because the base station notifies the configuration of the location via RRC signaling.

Figure 7:
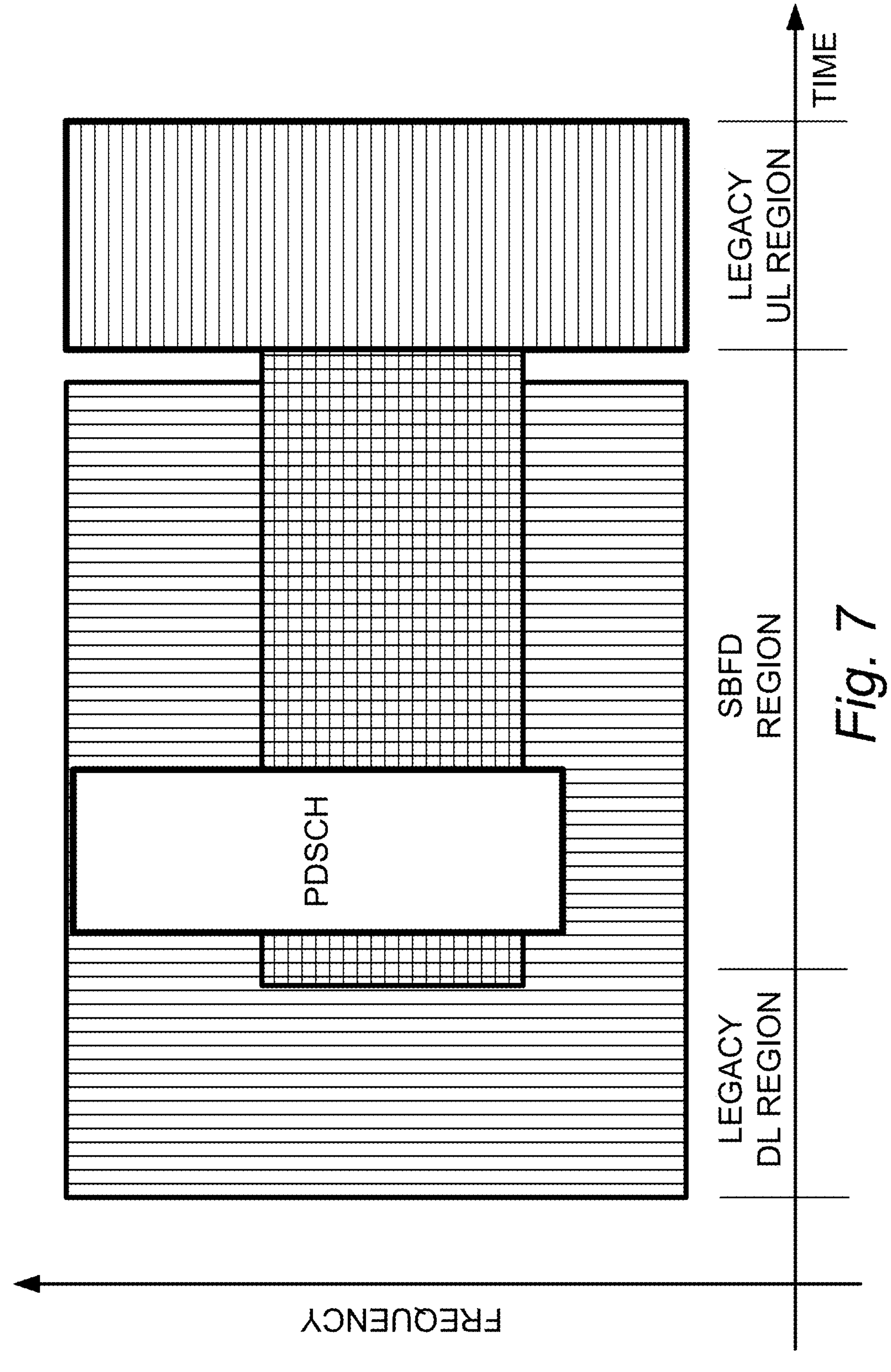
FIG. 7 is a diagrammatic view an example a resource grid capable of SubBand Full Duplex, SBFD, operation and showing resource assignment of a PDSCH overlapped with the UL resource set.

FIG. 7 shows an example of resource assignment for a wireless terminal on an enhanced duplex configuration. In FIG. 7, resource assignment of a PDSCH is overlapped with the UL resource set. In the case of FIG. 7, the gNB could schedule uplink transmission for another wireless terminal, and therefore, the PDSCH should be transmitted by avoiding the resource in the UL resource set. The wireless terminal is supposed to recognize the UL resource set as unavailable for the PDSCH.

Figure 8:
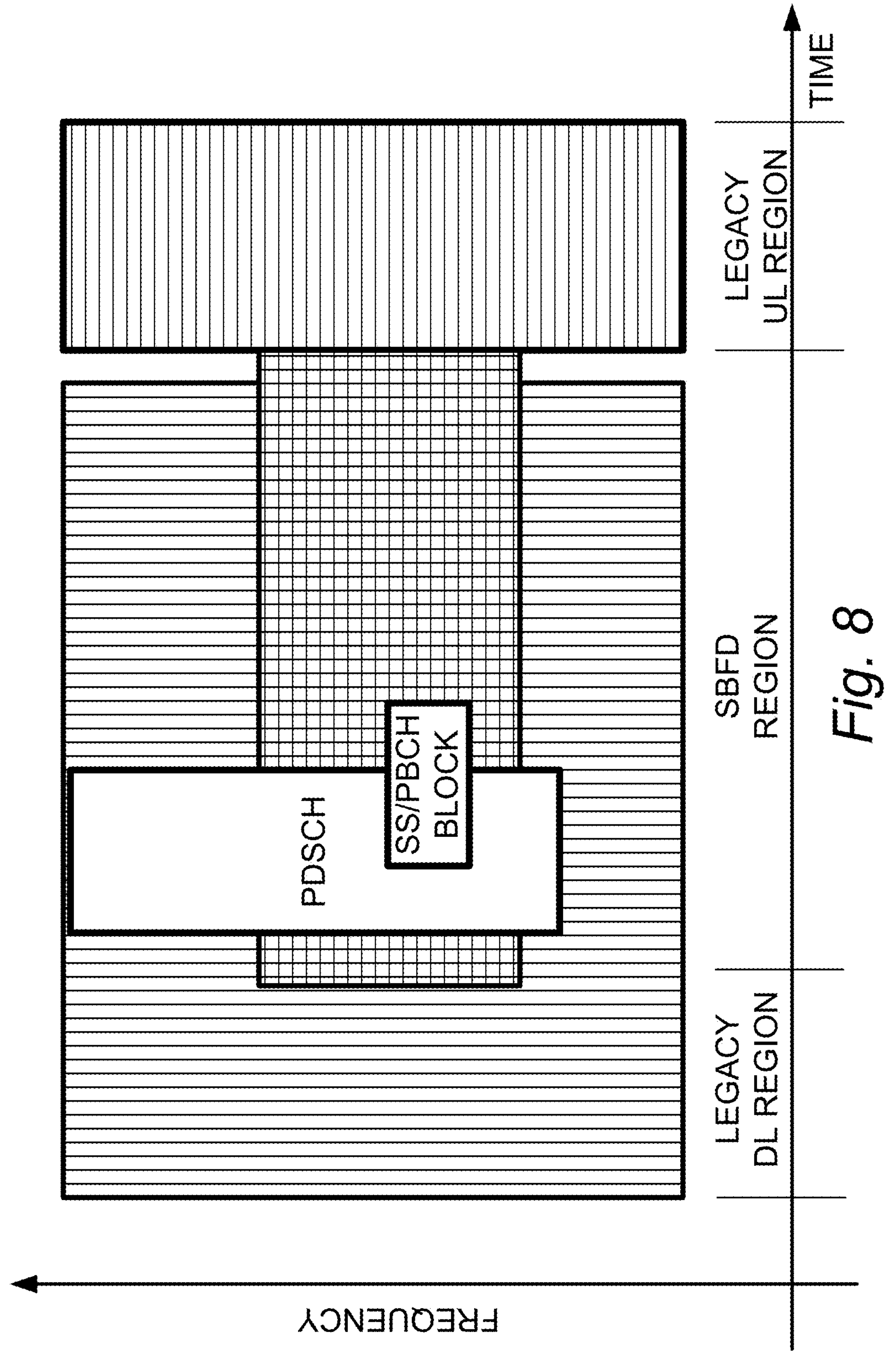
FIG. 8 is a diagrammatic view an example a resource grid capable of SubBand Full Duplex, SBFD, operation and showing resource assignment of a PDSCH overlapped with the SS/PBCH block as well as the UL resource set.

FIG. 8 is another example scenario of resource assignment for a wireless terminal on an enhanced duplex configuration. In FIG. 8, resource assignment of a PDSCH is overlapped with the SS/PBCH block as well as the UL resource set. In the case of FIG. 8, the gNB would not use the UL resource set in symbols with the SS/PBCH block for scheduling UL transmission. Therefore, the PDSCH can be mapped to the UL resource set in the symbols with the SS/PBCH block. Accordingly, the UL resource set in symbols without SS/PBCH, i.e., the symbols which do not overlap with SS/PBCH, would be still available for UL transmission, whereas the symbols within the SS/PBCH block would not be available for UL transmission.

Thus, for the scenario shown in FIG. 8, the resource assignment controller 66 may make a determination that symbols in the SubBand Full Duplex, SBFD, region in which both the SS/PBCH block and the downlink signal overlap in both the time domain and a frequency domain can be used for the downlink signal. As such, for the FIG. 8 scenario resource assignment controller 66 may make a determination that symbols SBFD uplink, UL, resource set which do not overlap with the SS/PBCH block in the time domain can be used for an uplink transmission.

Figure 9:
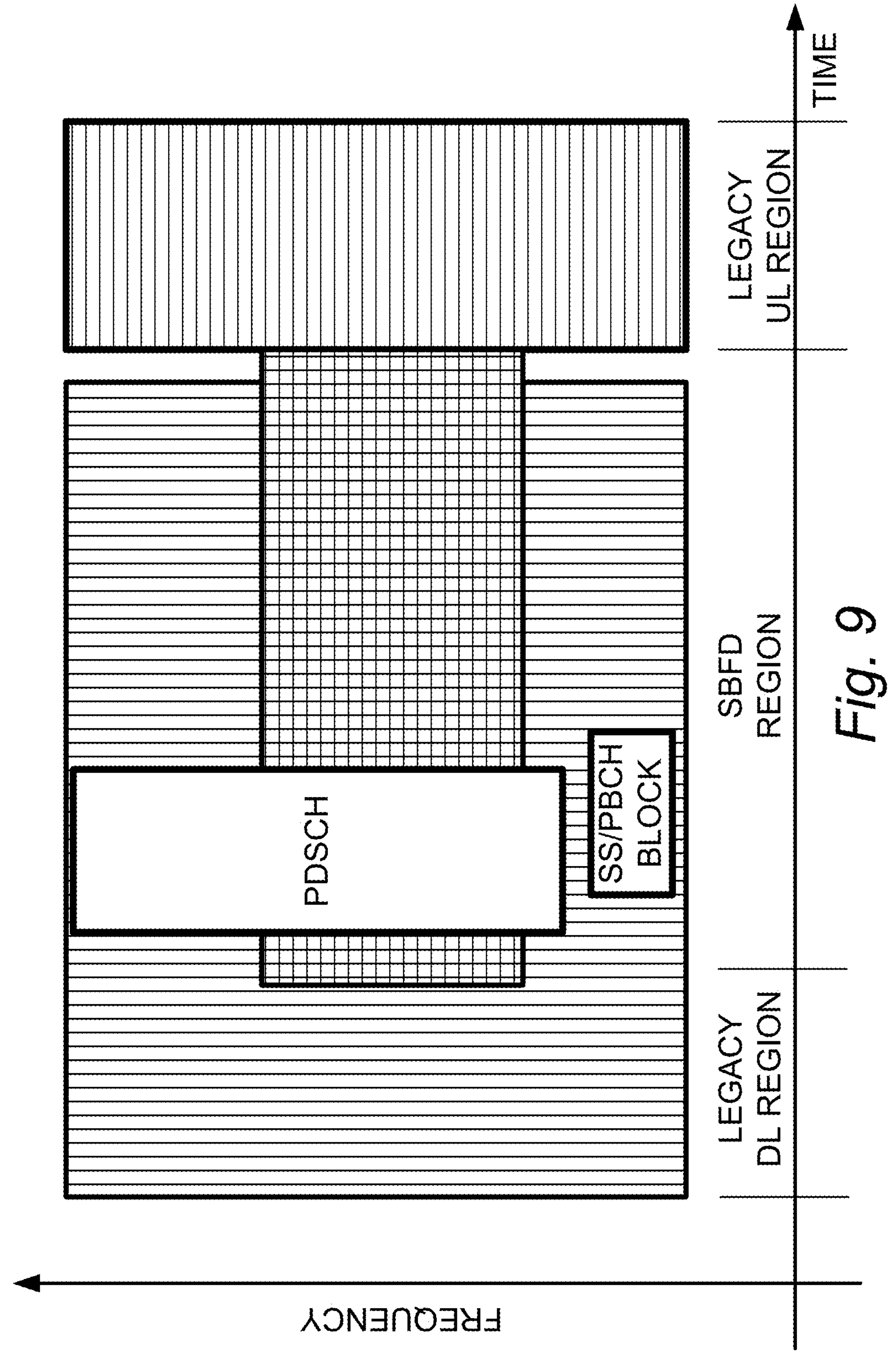
FIG. 9 is a diagrammatic view an example a resource grid capable of SubBand Full Duplex, SBFD, operation and showing resource assignment of a PDSCH overlapped with the UL resource set, and the resource assignment of the PDSCH overlapped with the SS/PBCH block in time domain.

FIG. 9 is another example scenario of resource assignment for a wireless terminal on an enhanced duplex configuration. In FIG. 9, resource assignment of a PDSCH is overlapped with the UL resource set, and the resource assignment of the PDSCH is overlapped with the SS/PBCH block in time domain. In the scenario of FIG. 9, the gNB may or may not use the UL resource set in symbols with the SS/PBCH block for scheduling UL transmission. The gNB may provide indication, e.g., by radio resource control, RRC, signaling or DCI, indicating whether or not for the wireless terminal to recognize the UL resource set in symbols with the SS/PBCH block as available.

Thus, in the situation shown in FIG. 9, the wireless terminal 30, e.g., resource assignment controller 66, makes a selective determination to map the downlink signal to symbols in the SubBand Full Duplex, SBFD, region, which overlap in the time domain with the SBFD UL resource set and the SS/PBCH block, in a case that the SS/PBCH block does not overlap in a frequency domain with the downlink signal. The determination of the FIG. 9 scenario may be based on an indication received from the radio access network. The indication may comprise the indication comprises radio resource control, RRC, signalling, or DCI. In this regard, the base station knows the configuration of the wireless terminal, including the PDSCH resource assignment, the UL resource set configuration, and the SS/PBCH block configuration. The base station knows the exact UE behavior by considering the configuration of the wireless terminal.

From the foregoing it should be understood that wireless terminal 30, e.g., resource assignment controller 66, is configured to perform various functions such as: (1) manage an uplink, UL, resource set, the UL resource set comprising a SubBand Full Duplex, SBFD, region of a resource grid defined by time/frequency resources; (2) determine resource assignment for the downlink link signal in consideration of the UL resource; and (3) to disable the UL resource set in symbols of the SBFD region which overlap in a time domain with a synchronization signal/physical broadcast, SS/PBCH, block.

Thus, the wireless terminal 30 comprises control circuitry configured to manage UL resource set defined by time/frequency resource; resource determination circuitry configured to determine resource assignment for a PDSCH based on the UL resource set if the UL resource set is enabled. The control circuitry is further configured to disable the UL resource set in symbols which overlaps with a SS/PBCH block. As used above, “enable” means that the wireless terminal determines resource assignment for any downlink transmission by taking the UL resource set into account. For example, if assigned resources for a PDSCH is overlapping partially with the UL resource set, the wireless terminal determines actual resource assignment as the resource excluding the UL resource set. “Disable” means that the wireless terminal determines resource assignment for any downlink transmission by NOT taking the UL resource set into account. For example, even if assigned resources for a PDSCH is overlapping partially with the UL resource set, the wireless terminal determines actual resource as is. It means that the wireless terminal receives signal for the PDSCH even in the UL resource set.

Therefore, as described herein, an efficient downlink resource allocation mechanism is provided by example embodiments and modes of the technology disclosed herein, which is particularly but not exclusively beneficial for SBFD.

The various foregoing example embodiments and modes may be utilized in conjunction with one or more example embodiments and modes described herein, as well as those of U.S. patent application Ser. No. 17/818,709, filed Aug. 9, 2022, entitled “COMMUNICATIONS NETWORK AND METHODS WITH SIGNALING OF SELECTIVE RECEPTIVITY”, which is incorporated herein by reference in its entirety. Technical terms and concepts including those mentioned above are further described below:

OFDM:

In a wireless communication system according to one aspect of the present embodiment, at least OFDM (Orthogonal Frequency Division Multiplex) is used. An OFDM symbol is a unit of time domain of the OFDM. The OFDM symbol includes at least one or more subcarriers. Contents in an OFDM symbol are converted to a time-continuous signal in baseband signal generation. In downlink, at least CP-OFDM (Cyclic Prefix-Orthogonal Frequency Division Multiplex) is used. In uplink, either CP-OFDM or DFT-s-OFDM (Discrete Fourier Transform-spread-Orthogonal Frequency Division Multiplex) is used. DFT-s-OFDM may be given by applying transform precoding to CP-OFDM. CP-OFDM is OFDM using CP (Cyclic Prefix).

The OFDM symbol may be a designation including a CP added to the OFDM symbol. That is, an OFDM symbol may be configured to include the OFDM symbol and a CP added to the OFDM symbol.

Serving Cell and Component Carrier:

A serving cell may be configured to include at least one downlink component carrier (downlink carrier) and/or one uplink component carrier (uplink carrier). A serving cell may be configured to include at least two or more downlink component carriers and/or two or more uplink component carriers. A downlink component carrier and an uplink component carrier are also referred to as component carriers (carriers).

Resource Grid:

For example, one resource grid may be provided for one component carrier. For example, one resource grid may be provided for combination of a component carrier and a subcarrier-spacing configuration u. A subcarrier-spacing configuration u is also referred to as numerology. A resource grid includes $N^{size,u}_{grid,\ x}N^{RB}_{sc}$ subcarriers. The resource grid starts from a common resource block with index $N^{start,u}_{grid}$. The common resource block with the index $N^{start,u}_{grid}$ is also referred to as a reference point of the resource grid. The resource grid includes $N^{subframe,u}_{symb}$ OFDM symbols. The subscript x indicates the transmission direction, and indicates either downlink or uplink. One resource grid is provided for an antenna port p, a subcarrier-spacing configuration u, and a transmission direction x.

Slot and Subframes:

For each subcarrier-spacing configuration u, the number of slots included in a subframe and indexes are provided. For example, slot index $n^u_s$ is provided in ascending order with an integer value ranging from 0 to $N^{subframe,u}_{slot}$-1 in a subframe. For subcarrier-spacing configuration u, the number of slots included in a radio frame and indexes of slots included in the radio frame is provided. Also, the slot index $n^u_s$, f is provided in ascending order with an integer value ranging from 0 to $N^{frame,u}_{slot}$-1 in the radio frame. Consecutive $N^{slot}_{symb}$ OFDM symbols are included in one slot. For example, $N^{slot}_{symb}$=14.

Resource Blocks (General):

A resource block (RB: Resource Block) includes $N^{RB}_{sc}$ consecutive subcarriers. A resource block is a generic name of a common resource block, a physical resource block (PRB: Physical Resource Block), and a virtual resource block (VRB: Virtual Resource Block). For example, $N^{RB}_{sc}$=12.

Common Resource Block:

Common resource blocks for a subcarrier-spacing configuration u are indexed in ascending order from 0 in the frequency domain in a common resource block-set. The common resource block with index 0 for the subcarrier-spacing configuration u includes (or collides with, matches) the point 3000. The index $n^u_{CRB}$ of the common resource block with respect to the subcarrier-spacing configuration u satisfies the relationship of $n^u_{CRB}$=ceil ($k_{sc}/N^{RB}_{sc}$) where the subcarrier with $k_{sc}$=0 is a subcarrier with the same center frequency as the center frequency of the subcarrier which corresponds to the point 3000.

Physical Resource Block:

Physical resource blocks for a subcarrier-spacing configuration u are indexed in ascending order from 0 in the frequency domain in a BWP. The index $n^u_{PRB}$ of the physical resource block with respect to the subcarrier-spacing configuration u satisfies the relationship of $n^u_{CRB}=n^u_{PRB}+N^{start,u}\ B_{WP,i}$. The $N^{start,u}_{BWP,i}$ indicates the reference point of BWP with index i.

BWP:

A BWP is defined as a subset of common resource blocks included in the resource grid. The BWP includes $N^{slot,u}_{BWP,i}$ common resource blocks starting from the reference points $N^{start,u}_{BWP,i}$. A BWP for the downlink component carrier is also referred to as a downlink BWP. A BWP for the uplink component carrier is also referred to as an uplink BWP.

One or more downlink BWPs may be configured for each serving cell (or each downlink component carrier). One or more uplink BWPs may be configured for each serving cell (or each uplink component carrier).

Among the one or more downlink BWPs set for the serving cell (or the downlink component carrier), one downlink BWP may be set as an active downlink BWP (or one downlink BWP may be activated). Among the one or more uplink BWPs set for the serving cell (or the uplink component carrier), one uplink BWP may be set as an active uplink BWP (or one uplink BWP may be activated).

A PDSCH, a PDCCH, and a CSI-RS may be received in the active downlink BWP. The wireless terminal may receive the PDSCH, the PDCCH, and the CSI-RS in the active downlink BWP. A PUCCH and a PUSCH may be sent on the active uplink BWP. The wireless terminal may transmit the PUCCH and the PUSCH in the active uplink BWP. The active downlink BWP and the active uplink BWP are also referred to as active BWP.

The PDSCH, the PDCCH, and the CSI-RS may not be received in downlink BWPs (inactive downlink BWPs) other than the active downlink BWP. The wireless terminal may not receive the PDSCH, the PDCCH, and the CSI-RS in the downlink BWPs which are other than the active downlink BWP. The PUCCH and the PUSCH do not need to be transmitted in uplink BWPs (inactive uplink BWPs) other than the active uplink BWP. The wireless terminal may not transmit the PUCCH and the PUSCH in the uplink BWPs which is other than the active uplink BWP. The inactive downlink BWP and the inactive uplink BWP are also referred to as inactive BWP.

Downlink BWP switching deactivates an active downlink BWP and activates one of inactive downlink BWPs. The downlink BWP switching may be controlled by a BWP field included in downlink control information. The downlink BWP switching may be controlled based on higher-layer parameters.

Uplink BWP switching is used to deactivate an active uplink BWP and activate any inactive uplink BWP. Uplink BWP switching may be controlled by a BWP field included in downlink control information. The uplink BWP switching may be controlled based on higher-layer parameters.

Among the one or more downlink BWPs set for the serving cell, two or more downlink BWPs may not be set as active downlink BWPs. For the serving cell, one downlink BWP may be active at a certain time.

Among the one or more uplink BWPs set for the serving cell, two or more uplink BWPs may not be set as active uplink BWPs. For the serving cell, one uplink BWP may be active at a certain time.

Carrier Aggregation:

Carrier aggregation may be communication using a plurality of aggregated serving cells. Carrier aggregation may be communication using a plurality of aggregated component carriers. Carrier aggregation may be communication using a plurality of aggregated downlink component carriers. Carrier aggregation may be communication using a plurality of aggregated uplink component carriers.

Downlink Physical Channel (General):

A downlink physical channel may correspond to a set of resource elements that carry information originating from the higher-layer and/or downlink control information. The downlink physical channel may be a physical channel used in the downlink component carrier. The base station transmits the downlink physical channel. The wireless terminal receives the downlink physical channel. In the wireless communication system according to one aspect of the present embodiment, at least a part or all of PBCH (Physical Broadcast Channel), PDCCH (Physical Downlink Control Channel), and PDSCH (Physical Downlink Shared Channel) may be used.

PDCCH:

A PDCCH is used to transmit downlink control information (DCI). A PDCCH is transmitted to deliver downlink control information. Downlink control information is mapped to a PDCCH. The terminal device 1 receives a PDCCH in which downlink control information is mapped. The base station transmits the PDCCH in which the downlink control information is mapped.

According to conventional technology, a wireless terminal typically determines on what resources to receive a physical downlink shared channel, PDSCH, according to a procedure that involves the following steps:

1) Detecting a downlink control information, DCI, format which schedules a PDSCH.
2) Determining allocated virtual resource blocks based on a value such as a Resource Indication Value, RIV, indicated by a frequency domain resource assignment field in the DCI form.
3) Determining allocated physical resource blocks for transmission of the PDSCH based on virtual resource block-to-physical resource block mapping, i.e., a VRB-to-PRB mapping.

DCI Format (General):

DCI format (Downlink control information format) is collection of information fields. “DCI format” may be used interchangeably with the phrase “DCI”. DCI format is a generic name for DCI format 0_0, DCI format 0_1, DCI format 1_0, and DCI format 1_1. Uplink DCI format is a generic name at least including the DCI format 0_0 and the DCI format 0_1. Downlink DCI format is a generic name at least including the DCI format 1_0 and the DCI format 1_1.

Figure 10:
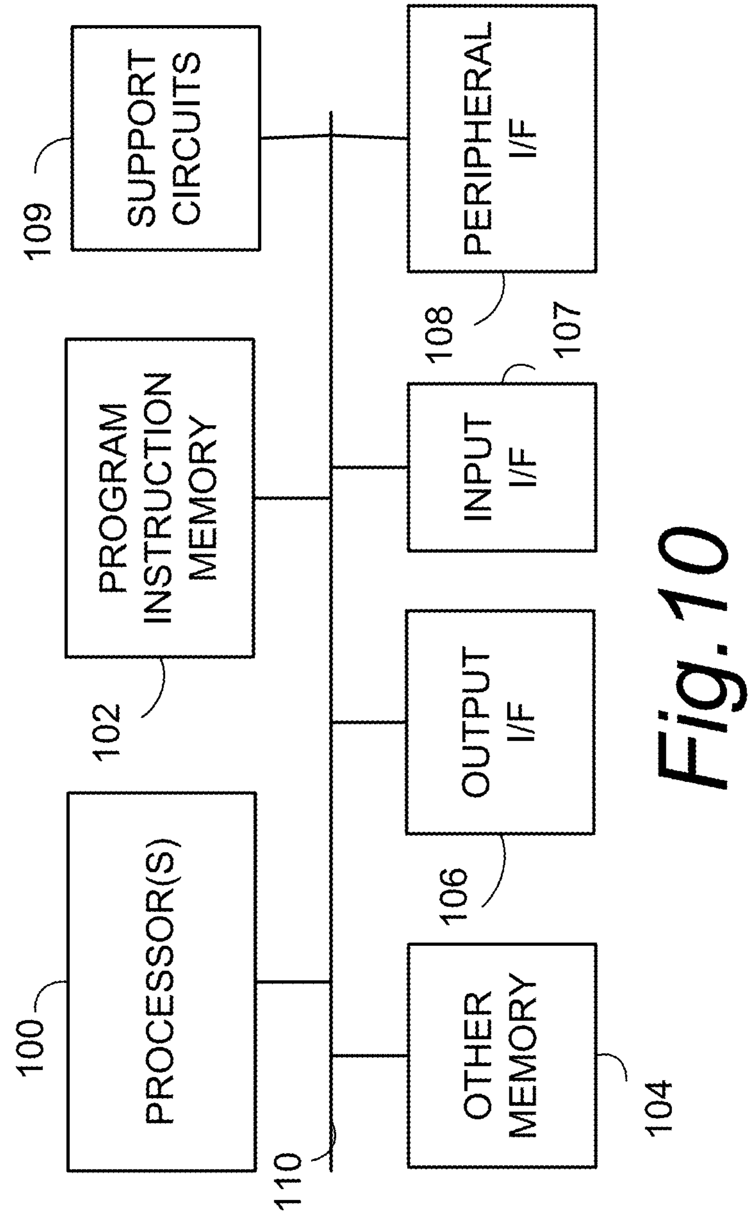
FIG. 10 is a diagrammatic view showing example elements comprising electronic machinery which may comprise a wireless terminal, a radio access node, and a core network node according to an example embodiment and mode.

As used herein, the term “and/or” should be interpreted to mean one or more items. For example, the phrase “A, B and/or C” should be interpreted to mean any of: only A, only B, only C, A and B (but not C), B and C (but not A), A and C (but not B), or all of A, B, and C. As used herein, the phrase “at least one of” should be interpreted to mean one or more items. For example, the phrase “at least one of A, B and C” or the phrase “at least one of A, B or C” should be interpreted to mean any of: only A, only B, only C, A and B (but not C), B and C (but not A), A and C (but not B), or all of A, B, and C. As used herein, the phrase “one or more of” should be interpreted to mean one or more items. For example, the phrase “one or more of A, B and C” or the phrase “one or more of A, B or C” should be interpreted to mean any of: only A, only B, only C, A and B (but not C), B and C (but not A), A and C (but not B), or all of A, B, and C Certain units and functionalities of the systems 20 may be implemented by electronic machinery. For example, electronic machinery may refer to the processor circuitry described herein, such as terminal processor circuitry 60 and base station processor 34 and suffixed versions thereof. Moreover, the term “processor circuitry” is not limited to mean one processor, but may include plural processors, with the plural processors operating at one or more sites. Moreover, as used herein the term “server” is not confined to one server unit but may encompasses plural servers and/or other electronic equipment and may be co-located at one site or distributed to different sites. With these understandings, FIG. 10 shows an example of electronic machinery, e.g., processor circuitry, as comprising one or more processors 100, program instruction memory 102; other memory 104 (e.g., RAM, cache, etc.); input/output interfaces 106 and 107, peripheral interfaces 108; support circuits 109; and busses 110 for communication between the aforementioned units. The processor(s) 100 may comprise the processor circuitries described herein, for example, terminal processor circuitry 60 and node processor circuitry 34, or any processor(s) of a network entity of the core network and suffixed versions thereof.

A memory or register described herein may be depicted by memory 104, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 109 are coupled to the processors 100 for supporting the processor in a conventional manner. These circuits include cache, power supplies, clock circuits, input/output circuitry and subsystems, and the like.

The term “configured” may relate to the capacity of a device whether the device is in an operational or non-operational state. Configured may also refer to specific settings in a device that effect the operational characteristics of the device whether the device is in an operational or nonoperational state. In other words, the hardware, software, firmware, registers, memory values, and/or the like may be “configured” within a device, whether the device is in an operational or nonoperational state, to provide the device with specific characteristics.

An interface may be a hardware interface, a firmware Interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminals and nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves reception and transmission in a telecommunications system, such as by mitigating cross link interference, for example.

One or more of the following documents may be pertinent to the technology disclosed herein (all of which are incorporated herein by reference in their entirety):

RP-221435, Revised WID on Multi-carrier enhancements

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A wireless terminal comprising:

a radio interface configured to receive a downlink signal from a radio access network; and processor circuitry configured to:

manage an uplink (UL) resource set, the UL resource set comprising a SubBand Full Duplex (SBFD) region of a resource grid defined by time and frequency resources, determine, based on an SBFD configuration and a synchronization signal/physical broadcast channel (SS/PBCH) configuration, whether the UL resource set overlaps an SS/PBCH block in time domain in the SBFD region, in response to determining that the UL resource set overlaps the SS/PBCH block, disable the UL resource set in-symbols that are in the SBFD region which overlap the SS/PBCH block, and determine a resource assignment for the downlink signal within the SBFD region based on the disabling.

2. A method in performed by a wireless terminal that includes a radio interface configured to receive a downlink signal from a radio access network, the method comprising:

receiving the downlink signal via the radio interface;

managing an uplink (UL) resource set, the UL resource set comprising a SubBand Full Duplex (SBFD) region of a resource grid defined by time and frequency resources;

determining, based on an SBFD configuration and a synchronization signal/physical broadcast channel (SS/PBCH) configuration, whether the UL resource set overlaps an SS/PBCH block in time domain in the SBFD region;

in response to determining that the UL resource set overlaps the SS/PBCH block, disabling the UL resource set symbols that are in the SBFD region which overlap the SS/PBCH block;

determining a resource assignment for the downlink signal within the SBFD region based on the disabling.

* * * * *